UNITED STATES PATENT OFFICE.

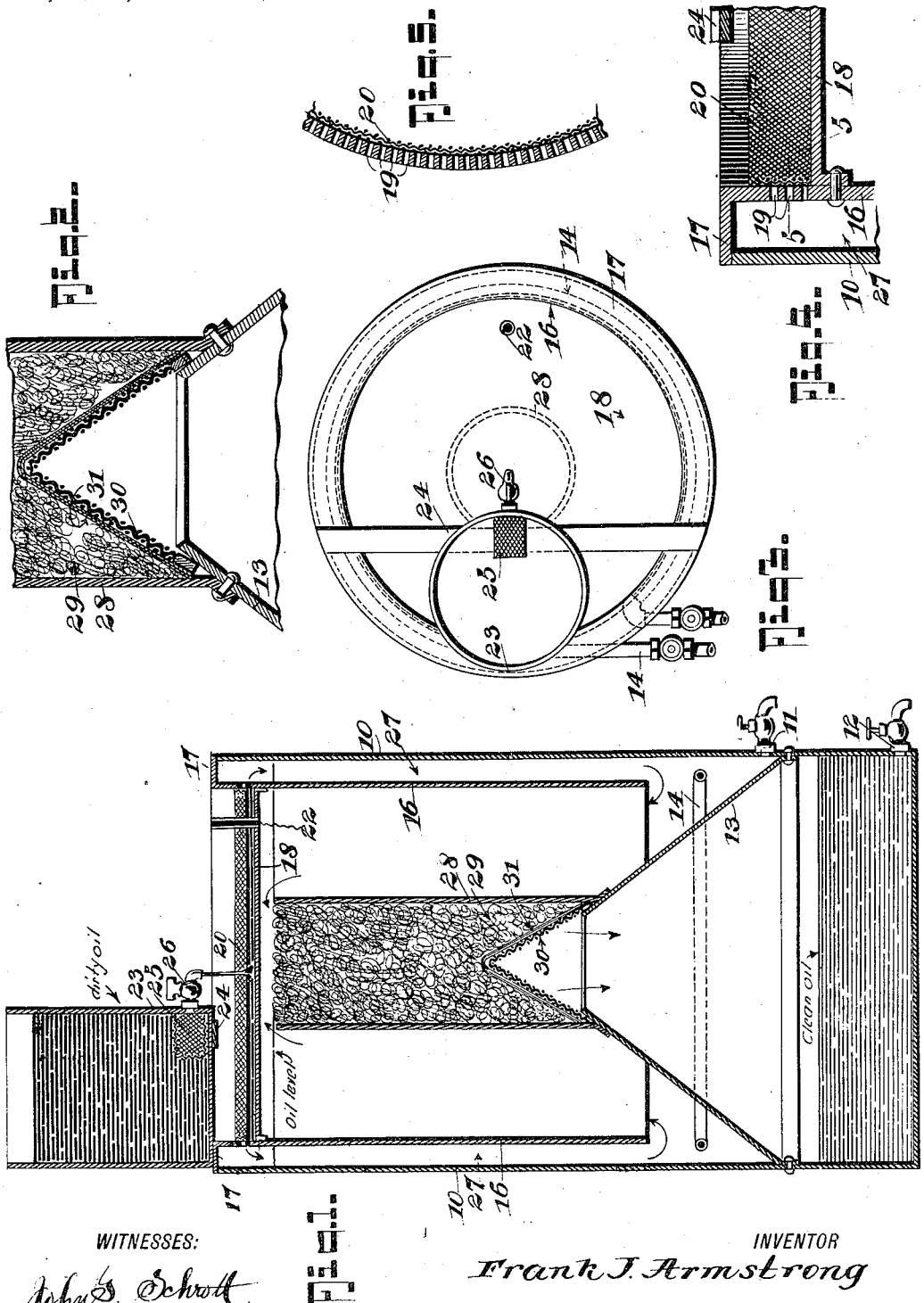

FRANK JAROME ARMSTRONG, OF CANADIAN, TEXAS, ASSIGNOR OF ONE-HALF TO HOMER T. BROADUS, OF CANADIAN, TEXAS.

OIL-FILTER.

1,218,506. Specification of Letters Patent. Patented Mar. 6, 1917.

Application filed April 19, 1916. Serial No. 92,157.

*To all whom it may concern:*

Be it known that I, FRANK J. ARMSTRONG, a citizen of the United States, and a resident of Canadian, in the county of Hemphill and State of Texas, have invented new and useful Improvements in Oil-Filters, of which the following is a specification.

This invention is an improvement in filtering apparatus and has particular reference to a filter for removing dirt, carbon, water and all other foreign substances from oil used in automobile engines and the like.

An object of the invention is to effectively separate all foreign substances from oil or other fluid, and to this end the apparatus includes a tank having an inner casing spaced therefrom and carrying a filtering device through which the fluid initially passes. A partition is also mounted within the tank and supports another filter or strainer, which projects into still another filter also supported by said partition, the fluid passing through the latter filter after flowing around said inner casing.

Another object is the provision of a filter of this character which is simple in construction, easy to manufacture, and effective in carrying out the purpose for which it is desired.

The inventive idea involved is capable of receiving a variety of mechanical expressions, one of which, for the purpose of illustrating the invention, is shown in the accompanying drawing, in which:

Figure 1 is a vertical sectional view of the apparatus constructed in accordance with the invention.

Fig. 2 is an enlarged sectional view of one of the filters or strainers employed in connection with the invention.

Fig. 3 is a top plan view of the apparatus.

Fig. 4 is an enlarged sectional view of another portion of the apparatus, and

Fig. 5 is a section on the line 5—5 of Fig. 4.

Referring more particularly to the accompanying drawing in which like reference characters indicate similar parts, the numeral 10 indicates a large tank preferably of cylindrical form and having upper and lower valve controlled outlets 11 and 12. Secured to the inner wall of the tank 10 intermediate the outlet openings, is an open ended partition 13 preferably of a frusto-conical formation, said partition forming compartments in the tank for the filtered and unfiltered fluid. The upper outlet 11 is employed to drain off the unfiltered oil, while the lower outlet 12 is employed to empty the clean oil therefrom. A steam pipe 14 is mounted within the tank 10 and surrounds the partition 13 intermediate the ends thereof, said pipe being connected either to a steam trap or regulated by valves.

An inner casing 16 is mounted in the tank 10 and is preferably cylindrical and is slightly smaller in diameter than said tank, said casing having an annular outwardly extending flange 17 at the top thereof which rests upon the top edge of said tank, whereby said casing is supported therein. The casing 16 is open at its bottom end, which extends to a point adjacent the steam pipe 14 and is closed adjacent its upper end by means of a flat plate 18 secured to the inner wall of the casing, in any preferred manner. The casing is provided just above the plate 18 with a plurality of rows of openings or passages 19 extending around said casing and covered on the inner side thereof by means of a wire screen 20. An air vent 22 extends through the plate 18.

A receptacle 23 is mounted upon the flange 17 of the inner casing 16 and is also supported in position by a rest 24. This receptacle is adapted to contain the unfiltered oil which initially passes through the strainer 25 and then on to the plate 18, the flow of the oil being controlled by means of a stop cock 26 secured to said receptacle. The oil, in passing through the screen 20 is partially filtered after which the same flows through the several openings 19, and thence downwardly into the space between the tank 10 and the inner casing 16, the upper compartment of the tank formed by the partition 13 then gradually filling.

Still further means are provided for filtering the oil and consist of a cylindrical filtering chamber 28 having its lower end mounted upon the upper end of the partition 13, and being filled and packed with cotton waste 29. It will thus be seen that when the level of the oil reaches the top of the chamber 28, said oil will flow thereinto and be further filtered in passing through the waste 29. At the bottom end of the chamber 28, and also supported by the upper end of the partition 13, is a further filtering device which consists of a conical element 30 preferably formed of a screen covered with cotton flannel 31, said screen projecting into the lower end of the chamber 28 a suitable distance. The screen of the element 30 is preferably of what is known as "hail screen" and which is formed of 16 or 18 galvanized iron wire having one fourth inch mesh. It will thus be seen that the oil after passing through the waste 29 will be further filtered through the flannel cover 31 and screen 30, whereby it will fall into the bottom of the lower compartment of the tank from which it may be taken, through the medium of the valve controlled outlet 12.

What is claimed is:

1. A filtering apparatus, comprising a tank having valve controlled outlets, a frusto-conical partition having its lower end secured to the inner face of the tank between the said outlets, said partition being open at the top and dividing the tank into two compartments, an inner casing provided with a horizontal partition below its upper end forming a chamber above the same and provided with openings in its side above said partition, said casing forming a closure for the tank and spaced from and projecting into the same to a point below the upper end of the conical partition, a filtering medium on the horizontal partition, a cylindrical chamber of greater diameter than the open end of the conical partition and mounted thereon, said chamber containing a filtering means and having an open upper end terminating a short distance from the partition of the casing, a conical filtering device supported upon the conical partition and projecting into said chamber, and a steam pipe surrounding the conical partition below the end of the said casing.

2. A filtering apparatus, comprising a tank, a frusto-conical partition in the tank and dividing it into upper and lower compartments, an open ended casing provided at its upper end with an outwardly extending flange resting upon the upper end of the tank and with a horizontal partition a short distance below its upper end and forming a chamber above the same, said casing being spaced from the tank and having its lower end surrounding the upper end of the conical partition, the casing forming a cover for the tank and provided above the partition with a plurality of openings, wire gauze on said partition, a cylindrical chamber mounted on the upper end of the conical partition with its upper end terminating a short distance below the partition of the casing, said chamber containing a filtering medium, a conical filtering device supported upon the upper end of the said conical partition and projecting into the said chamber, and a steam pipe surrounding the conical partition a short distance below the open end of the casing.

FRANK JAROME ARMSTRONG.